Patented Feb. 5, 1929.

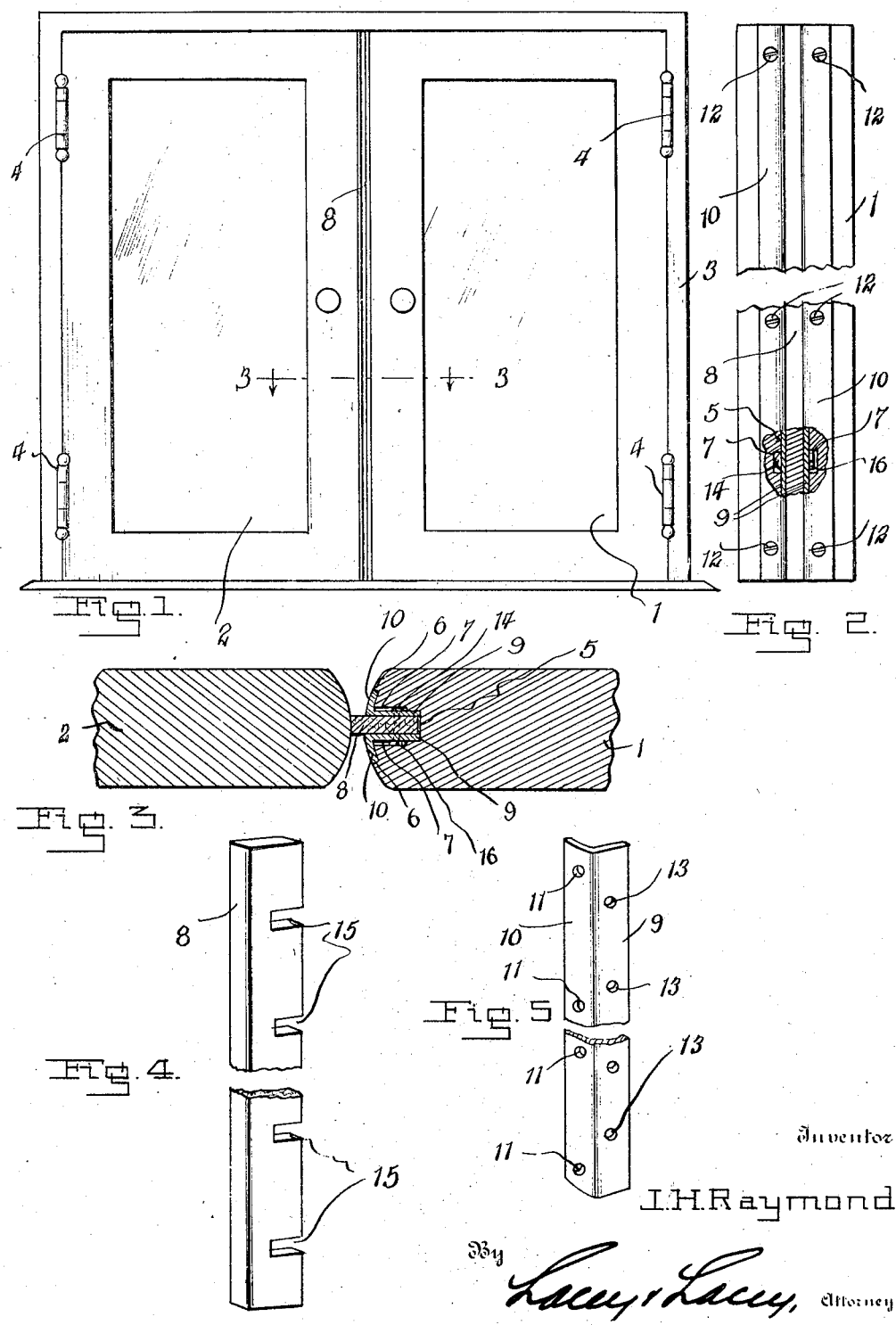
Feb. 5, 1929.   1,701,214
J. H. RAYMOND
WEATHER STRIPPING
Filed Dec. 21, 1927
Inventor
J.H. Raymond
By Lacey & Lacey, Attorneys

1,701,214

UNITED STATES PATENT OFFICE.

JOSEPH H. RAYMOND, OF WICHITA, KANSAS.

WEATHER STRIPPING.

Application filed December 21, 1927. Serial No. 241,611.

This invention relates to weather stripping and one object of the invention is to provide weather stripping which may be easily applied to a closure, such as a hingedly mounted door or window and very effectively seal space between the closure and its frame or a companion closure.

Another object of the invention is to cause a sealing strip forming part of the weather stripping to be firmly held in place with a portion projecting from the closure to which it is applied and permit the sealing strip to be adjusted so that it will project from the closure a desired distance.

Another object of the invention is to provide weather stripping which will be of a simple construction and may be very easily applied to a door or other closure.

The invention is illustrated in the accompanying drawing, wherein

Figure 1 is a view in elevation showing doors having the improved weather stripping applied to one of them;

Fig. 2 is a view looking at the free edge of a door provided with the improved weather stripping;

Fig. 3 is a fragmentary sectional view taken on the line 3—3 of Fig. 1;

Fig. 4 is a perspective view of the sealing strip forming part of the weather stripping, and Fig. 5 is a perspective view of a side strip forming part of the weather stripping.

The weather stripping constituting the subject-matter of this invention has been shown applied to a door 1 which together with a companion door 2 are hingedly mounted in a frame 3 by suitable hinges 4. The free side edges of the two doors are slightly spaced from each other, as shown in Fig. 3, and rounded transversely so that the doors may be easily opened or closed and the improved weather stripping is employed to close the space between the two doors in order to prevent air from passing between them. The door 1 has a groove 5 formed in its free side edge face between bordering recesses 6 and seats 7 are formed in the walls of the groove 5 in suitably spaced relation to each other longitudinally thereof for a purpose to be hereinafter set forth.

The sealing strip 8 of the weather stripping may be formed of felt, rubber or any other desired material having sufficient flexibility, and this sealing strip is disposed between side strips 9 which are preferably formed of metal and are bent to provide attaching flanges 10 which project transversely from opposite side faces of the sealing strip and are received in the recesses 6 with their outer faces flush with the free edge face of the door. Openings 11 are formed in the flanges 10 to receive screws 12 by means of which the weather stripping is securely but releasably held in engagement with the door. There has also been provided openings 13 which are spaced from each other longitudinally of the side strips, as shown in Fig. 5, and these openings are to receive securing bolts 14 which also pass through slots 15 formed in the sealing strip and opening through the inner edge face thereof. It will be readily seen that when the securing nuts 16 of the bolts are tightened the sealing strip will be firmly held in a set position between the side strips and that by loosening the nuts the sealing strip may be adjusted until it projects from the side strips a desired distance and the nuts then again tightened. Therefore, after the weather stripping has been in use for some time and becomes worn to such an extent that it does not properly contact with the free edge face of the door 2, it can be adjusted until it will again form a tight closure for the space between the two doors. The recesses or seats 7 are provided so that the heads of the bolts and their securing nuts may be received in these seats when the weather stripping is fitted into the groove 5 formed in the door. This not only permits the weather stripping to be easily inserted or removed but also permits the bolts to rest upon the lower walls of the seats and thereby support the weather stripping in the groove and remove some of the strain from the securing screws 12. Since the weight of the weather stripping is not borne by the screws, they may be very easily removed or set in place.

Having thus described the invention, I claim:

1. A swinging closure hinged at one side and having its opposite free edge face formed with a longitudinally extending groove, the side walls of the groove being formed with opposed recesses opening through the said edge face of the closure, and weather stripping for said closure comprising side strips of rigid material fitting against the walls of said groove and having side flanges fitting against the said side edge face of the closure and secured thereto, a sealing strip of pliable material disposed between said strips and projecting outwardly therefrom, and fasteners passed through the side strips and sealing strip with their ends seated in said recesses.

2. A swinging closure hinged at one side and having its opposite free edge face formed with a longitudinally extending groove, the side walls of the groove being formed with opposed recesses opening through the said edge face of the closure, and weather stripping for said closure comprising side strips of rigid material fitting against the walls of said groove and having side flanges fitting against the said side edge face of the closure and secured thereto, a sealing strip of pliable material disposed between said strips and projecting outwardly therefrom, the inner portion of the sealing strip being formed with transversely extending slots opening through its inner edge face and the side strips having openings registering with the slots, and securing bolts passed through the slots and openings to releasably secure the sealing strip in an adjusted position between the side strips and having their heads and nuts seated in the recesses formed in the side walls of said groove.

3. A swinging closure hinged at one side and having its opposite free edge face formed with a longitudinally extending groove, the side walls of the groove being formed with opposed recesses opening through the said edge face of the closure, and weather stripping for said closure comprising side strips of rigid material fitting against the walls of said groove, a sealing strip of pliable material between said side strips, fasteners passed transversely through the side strips and sealing strip with their ends seated in said recesses, and means passed through the side strips to secure the weather stripping in said groove.

4. Weather stripping comprising side strips of rigid material formed with alined openings and bent longitudinally to provide securing flanges, a sealing strip of pliable material disposed between said side strips and projecting outwardly therefrom and formed with slots leading from its inner edge face and disposed between the opening in the side strips, and securing bolts passed through the openings and slots of said strips to releasably retain the sealing strip clamped between the side strips in a set position.

5. Weather stripping comprising side strips of rigid material formed with alined openings spaced from each other longitudinally thereof, a sealing strip of pliable material between said side strips and having transversely extending slots registering with the openings in the side strips and opening through the inner edge face of the sealing strip, and releasable fasteners passed through the openings and slots of said strips to releasably retain the sealing strip clamped between the side strips in a set position with a portion projecting from between the side strips a predetemined distance.

In testimony whereof I affix my signature.

JOSEPH H. RAYMOND. [L. S.]